(12) United States Patent
Williams et al.

(10) Patent No.: US 12,408,646 B2
(45) Date of Patent: Sep. 9, 2025

(54) SYSTEMS AND METHODS FOR SEMI-AUTOMATIC FLY-FISHING REELS

(71) Applicant: OClarkii, LLC, Buffalo, WY (US)

(72) Inventors: Bradly Williams, Buffalo, WY (US);
Zac Sexton, Buffalo, WY (US);
Rodney Fought, Buffalo, WY (US);
Andrew Mechura, Buffalo, WY (US)

(73) Assignee: OClarkii, LLC, Buffalo, WY (US)

( * ) Notice: Subject to any disclaimer, the term of this patent is extended or adjusted under 35 U.S.C. 154(b) by 0 days.

(21) Appl. No.: 19/113,766

(22) PCT Filed: Oct. 25, 2023

(86) PCT No.: PCT/US2023/077721
§ 371 (c)(1),
(2) Date: Mar. 20, 2025

(87) PCT Pub. No.: WO2024/092000
PCT Pub. Date: May 2, 2024

(65) Prior Publication Data
US 2025/0261623 A1    Aug. 21, 2025

Related U.S. Application Data

(60) Provisional application No. 63/419,023, filed on Oct. 25, 2022.

(51) Int. Cl.
*A01K 89/01* (2006.01)
*A01K 87/00* (2006.01)
*A01K 87/02* (2006.01)

(52) U.S. Cl.
CPC ............ *A01K 87/02* (2013.01); *A01K 87/007* (2013.01)

(58) Field of Classification Search
CPC ........ A01K 89/01123; A01K 89/01127; A01K 89/01925; A01K 87/02; A01K 87/06
See application file for complete search history.

(56) References Cited

U.S. PATENT DOCUMENTS

| | | |
|---|---|---|
| 905,428 A | 12/1908 | Heddon |
| 2,479,952 A | 8/1949 | Matson |

(Continued)

FOREIGN PATENT DOCUMENTS

| | | | |
|---|---|---|---|
| CN | 210329033 U | * 4/2020 | |
| DE | 19701236 A1 | * 7/1998 | ............. A01K 89/00 |

(Continued)

OTHER PUBLICATIONS

Amazon.com : Orvis Clearwater Fly Rod Outfit (3wt 10'0" 4pc) : Sports & Outdoors. Website. Obtained Jun. 30, 2023. 7 pages. https://www.amazon.com/Orvis-Clearwater-Fly-Rod-Outfit/dp/B09RS591ZM/ef=dp_prsubs_sccl_1/143-7961804-2693937?pd_rd_w=TsiCL&content-id . . . , 7 pages.

(Continued)

*Primary Examiner* — Emmanuel M Marcelo
(74) *Attorney, Agent, or Firm* — Santangelo Law Offices, P.C.

(57) ABSTRACT

Embodiments of the present application may include fishing reel assemblies (1) having a fishing reel (2), a toollessly adjustable mounting foot (3) attached to a fishing reel which can allow adjustability of a fishing rod (4) with respect to the reel (2). A fishing reel assembly may include at least one mount (19) for attachment of accessories and perhaps even a fishing line guide (21). An adjustable mounting foot (3) may include a rod connector section (36) and a reel connector section (37) configured to be separated from each other which may allow a user to easily switch out a rod and/or reel in a fishing reel assembly.

48 Claims, 10 Drawing Sheets

(56) References Cited

U.S. PATENT DOCUMENTS

| | | | |
|---|---|---|---|
| 2,543,881 A | | 3/1951 | Umphlette |
| 2,571,440 A | | 10/1951 | Goldberg |
| 2,765,990 A | | 10/1956 | Engel |
| 3,653,141 A | * | 4/1972 | Rumbaugh ............ A01K 87/06 43/22 |
| 4,696,123 A | * | 9/1987 | Bailey, Jr. .............. A01K 87/06 43/22 |
| 5,291,683 A | | 3/1994 | Yamato |
| 5,467,932 A | | 11/1995 | Puryear |
| 5,481,820 A | | 1/1996 | Ohmura |
| 5,669,566 A | | 9/1997 | Puryear |
| 5,904,000 A | | 5/1999 | Ohmura |
| 6,105,301 A | | 8/2000 | Ohmura |
| 6,283,393 B1 | | 9/2001 | Kang |
| 6,874,719 B2 | | 4/2005 | Ikuta |
| 7,178,751 B1 | | 2/2007 | Isaacs |
| 8,833,689 B1 | | 9/2014 | Brown |
| 9,554,565 B2 | | 1/2017 | Koelewyn |
| 9,807,988 B2 | | 11/2017 | Westerfield |
| 10,993,424 B1 | | 5/2021 | Morse et al. |
| 2005/0034351 A1 | | 2/2005 | Borgeat |
| 2008/0035774 A1 | | 2/2008 | Bao-Coutado |
| 2010/0001113 A1 | | 1/2010 | Grahl |
| 2011/0239518 A1 | * | 10/2011 | Zuckerman ............ A01K 87/06 43/22 |
| 2012/0311915 A1 | | 12/2012 | Huang |
| 2013/0206889 A1 | | 8/2013 | Ochiai |
| 2013/0283665 A1 | | 10/2013 | Poe |
| 2014/0054403 A1 | | 2/2014 | Maerz et al. |
| 2014/0101983 A1 | | 4/2014 | Scott |
| 2014/0151484 A1 | | 6/2014 | Header |
| 2017/0311582 A1 | * | 11/2017 | McCain ........... A01K 89/01925 |
| 2022/0346359 A1 | | 11/2022 | MacDonald |
| 2022/0394968 A1 | | 12/2022 | Milton |

FOREIGN PATENT DOCUMENTS

| | | |
|---|---|---|
| JP | 2009-95330 A | 5/2009 |
| WO | 2024092000 A1 | 5/2024 |

OTHER PUBLICATIONS

Peux Fulgor Semi Automatic Fly Reel—Tactical Fly Fisher. Website. Obtained Jun. 30, 2023. 21 pages. https://tacticalflyfisher.com/products/peux-fulgor-semi-automatic-fly-reel, 21 pages.

Amazon.com : Pflueger Automatic Fly Reel, Size 44385 Fishing Reel, Right Handle Position, Corrosion-Resistant Aluminum Alloy . . . Website. Obtained Jun. 30, 2023. 8 pages. https://www.amazon.com/gp/product/B000ZKPH3U/ref=as_li_qf_asin_il_tl?ie=UTF8&tag=wade21-20&creative=9325&linkCode=as2&creativeASIN=B . . . , 8 pages.

G. Loomis NRX+ Freshwater Fly Rod | Trident Fly Fishing. Website. Obtained Jun. 30, 2023. 8 pages. https://www.tridentflyfishing.com/g-loomis-nrx-freshwater-flyrod. html?avad=276093_a3196b5dd, 8 pages.

U.S. Appl. No. 63/419,023, filed Oct. 25, 2022. First named inventor: Williams.

International PCT Application No. PCT/US23/77721, filed Oct. 25, 2023. First named inventor: Williams.

International PCT Application No. PCT/US23/77721, filed Oct. 25, 2023. First named inventor: Williams. International Search Report dated Mar. 15, 2024. 3 pages.

International PCT Application No. PCT/US23/77721, filed Oct. 25, 2023. First named inventor: Williams. Written Opinion of the International Search Authority dated Mar. 15, 2024. 13 pages.

International PCT Application No. PCT/US23/77721, filed Oct. 25, 2023. First named inventor: Williams. International Preliminary Report on Patentability dated Sep. 16, 2024. 42 pages.

* cited by examiner

SYSTEMS AND METHODS FOR SEMI-AUTOMATIC FLY-FISHING REELS

This application is a United States National Phase of International PCT Patent Application No. PCT/US23/77721, filed Oct. 25, 2023, which claims priority to and the benefit of U.S. Provisional Patent Application No. 63/419,023 filed Oct. 25, 2022, both applications are hereby incorporated by reference herein in its entirety.

TECHNICAL FIELD

Embodiments include fishing reel assemblies with toolless adjustable mounting of a rod to a reel, a reel to a rod, mounting capabilities for accessories on a fishing reel, and even fishing line guides.

BACKGROUND

In the past, fly-reel designs have had many problems such as inconsistent line retrieval; can introduce slack during line retrieval; can have tangling of line around a reel and even a rod interface; can have tangling of line around a lever on a semi-automatic reel; difficulty in picking up slack line that has been taken off a reel; may have gears exposed to outdoor elements such as water, dirt, mud, and weeds, that can wear, freeze, and even corrode the gears and drag system; and perhaps even may not have a set counter-balance point of weight where a reel and rod can join together.

It is desirable to provide an easy way to move a position of the reel along the rod's length perhaps to aid in counterbalance, or even to make the rod settle evenly in the grip of an angler's hand. In the past, reels have had a fixed point where the reel attaches to the reel foot and then the seat on the fly rod at a given distance with no option for adjustment.

DISCLOSURE OF INVENTION

The present application includes a variety of aspects, which may be selected in different combinations based upon the particular application or needs to be addressed. In various embodiments, the application may include methods and systems for fishing reel assemblies.

It is an object of the application to provide an easily adjustable mounting system to adjust a fishing rod with respect to a fishing reel.

It is another object of the application to provide at least one mount on a fishing reel that can be used to attach an accessory to a reel.

It is yet another object of the application to prevent fishing line tangling perhaps with a fishing line guide.

Naturally, further objects, goals and embodiments of the application are disclosed throughout other areas of the specification, claims, and drawings.

MODE(S) FOR CARRYING OUT THE INVENTION

It should be understood that embodiments include a variety of aspects, which may be combined in different ways. The following descriptions are provided to list elements and describe some of the embodiments of the application. These elements are listed with initial embodiments; however, it should be understood that they may be combined in any manner and in any number to create additional embodiments. The variously described examples and preferred embodiments should not be construed to limit the embodiments of the application to only the explicitly described systems, techniques, and applications. The specific embodiment or embodiments shown are examples only. The specification should be understood and is intended as supporting broad claims as well as each embodiment, and even claims where other embodiments may be excluded. Importantly, disclosure of merely exemplary embodiments is not meant to limit the breadth of other more encompassing claims that may be made where such may be only one of several methods or embodiments which could be employed in a broader claim or the like. Further, this description should be understood to support and encompass descriptions and claims of all the various embodiments, systems, techniques, methods, devices, and applications with any number of the disclosed elements, with each element alone, and also with any and all various permutations and combinations of all elements in this or any subsequent application.

Embodiments of the application may include a fishing reel assembly comprising fishing reel; and even a toollessly adjustable mounting foot attached to said fishing reel; wherein said toollessly adjustable mounting foot is configured to be attached to a fishing rod. Other embodiments may provide a method of using a fishing reel assembly comprising providing a fishing reel having an adjustable mounting foot attached to said fishing reel; attaching a fishing rod to said adjustable mounting foot; and even while said fishing rod is attached to said fishing reel with said adjustable mounting foot, toollessly adjusting said placement of said fishing rod with respect to said fishing reel with said adjustable mounting foot.

Figure 1:
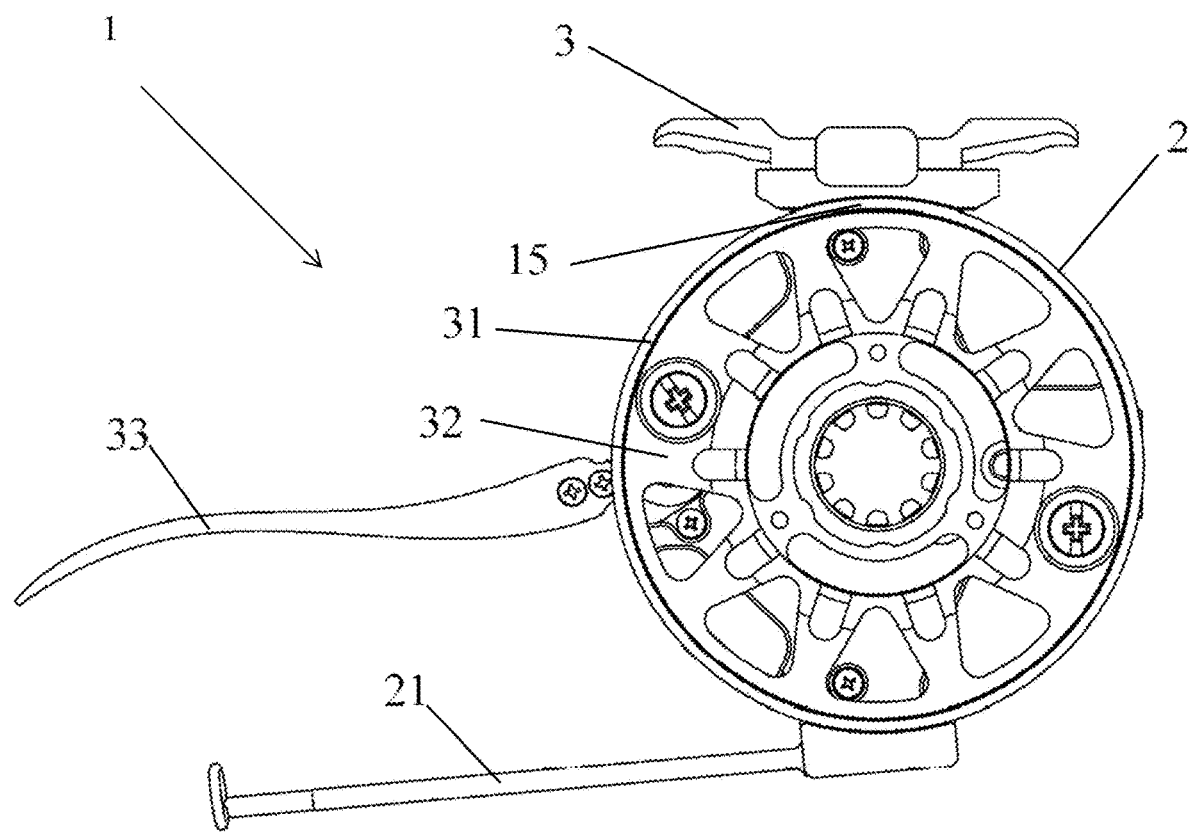
FIG. 1 shows a front view of a fishing reel in accordance with some embodiments.
Figure 17:
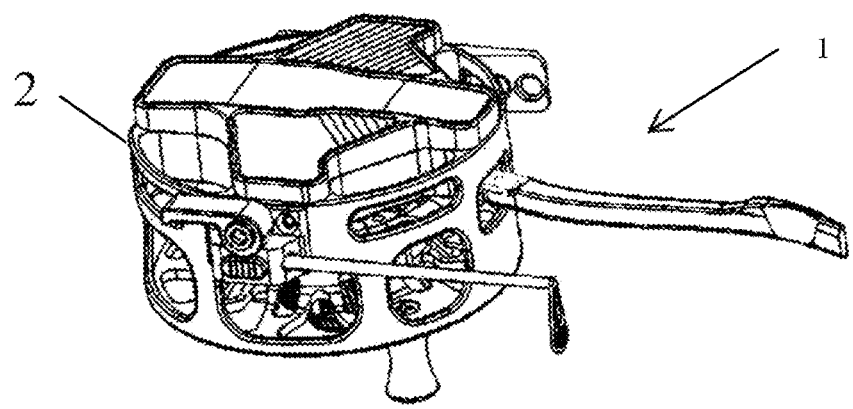
FIG. 17 shows a fishing reel assembly in accordance with some embodiments.
Figure 19:
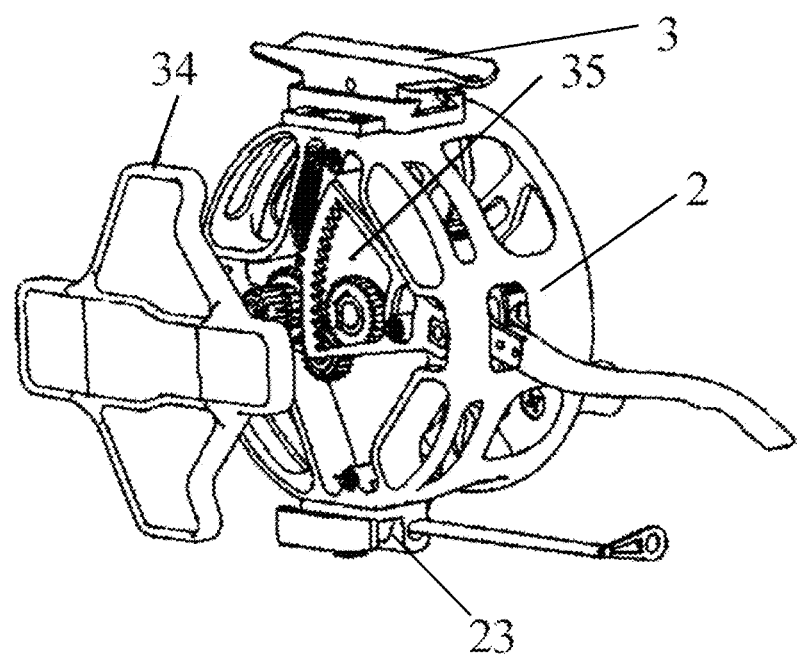
FIG. 19 shows a fishing reel assembly in accordance with some embodiments.
Figure 20:
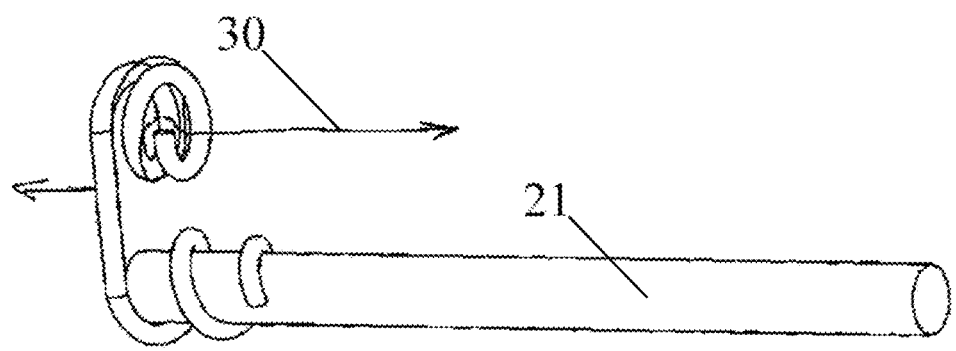
FIG. 20 shows a line guide in accordance with some embodiments.

As shown in FIGS. 1, 17 and 19, a fishing reel assembly (1) may include a fishing reel (2) which may be a fly fishing reel, a toollessly adjustable mounting foot (3), a housing (31), spool (32), lever (33), line guide (21), a housing sealing cover (34), and even a drive assembly (35).

Figure 12:
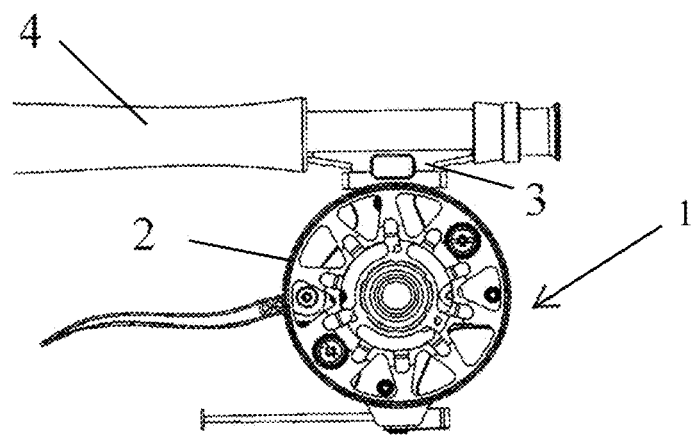
FIG. 12 shows a front view of a fishing reel attached to a fishing rod in accordance with some embodiments.
Figure 15:
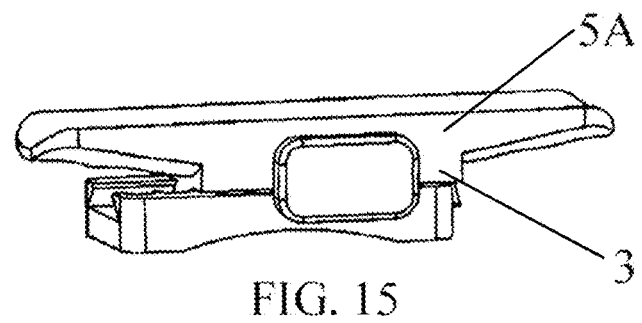
FIG. 15 shows an adjustable mounting foot in a first position in accordance with some embodiments.
Figure 16:
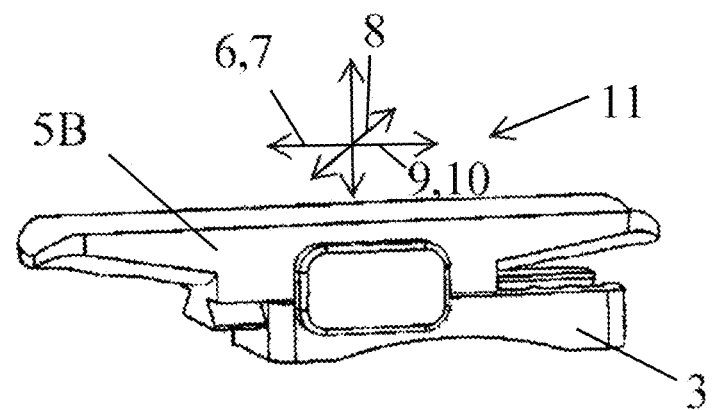
FIG. 16 shows an adjustable mounting foot in a second position in accordance with some embodiments.

Embodiments of this application may provide an adjustable mounting foot (3) which can allow a user to balance a fishing reel (2) with a fishing rod (4), fly rod, or the like even an adjustable location for user comfort. An adjustable mounting foot can be attached to a reel, such as a fishing reel, a fly-fishing reel or the like. A user can attach a fishing rod (4) to an adjustable mounting foot (3) and while a fishing rod is attached to a fishing reel with the adjustable mounting foot, a user may be able to toollessly adjust a placement (5A. 5B) of a fishing rod with respect to said fishing reel with the adjustable mounting foot. A toolessly adjustable mounting foot may allow a user to move a mounting foot without having to use any separate tools (e.g., screwdriver, wrench, pliers, or the like) for movement. In general, a rod with respect to a reel using the adjustable mounting foot may be able move in a direction (11) such as forward (6), backward (7), sideways (8), upward (9), downward (10), and the like as may be understood in FIGS. 12, 13 and 16. For example, FIGS. 15 and 16 provide a first position (5A) of an adjustable mounting foot (3) and a second position (5B) of an adjustable mounting foot (3) in a backward and forward position. An adjustable mounting foot (3) may be located at a top (15) of a fishing reel such as shown in FIG. 1.

Figure 2:
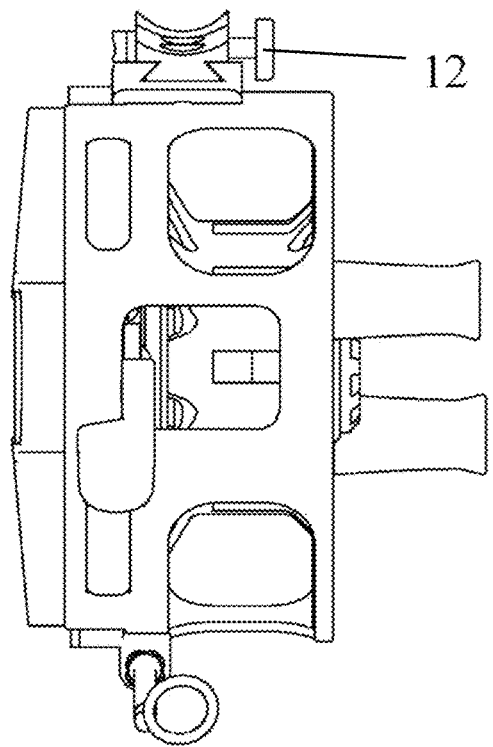
FIG. 2 shows a side view of a fishing reel in accordance with some embodiments.
Figure 4:
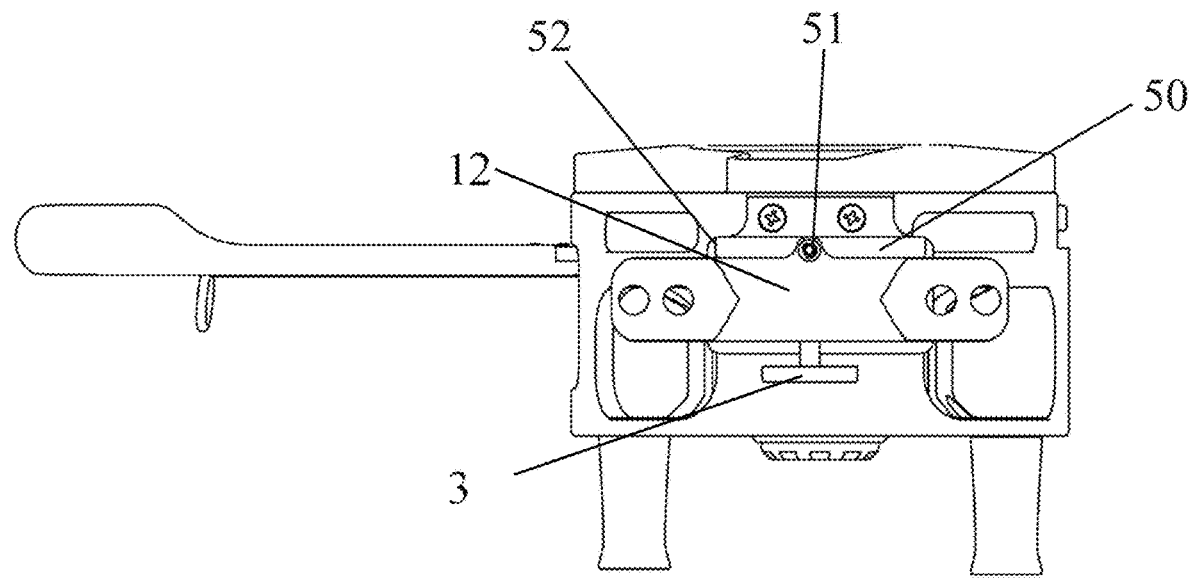
FIG. 4 shows a top view of a fishing reel and adjustable mounting foot in accordance with some embodiments.
Figure 5:
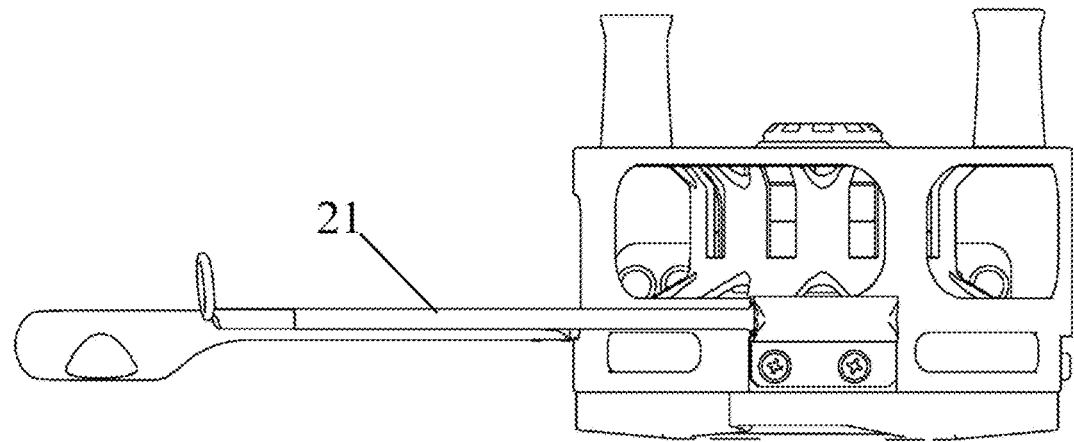
FIG. 5 shows a bottom view of a fishing reel in accordance with some embodiments.
Figure 6:
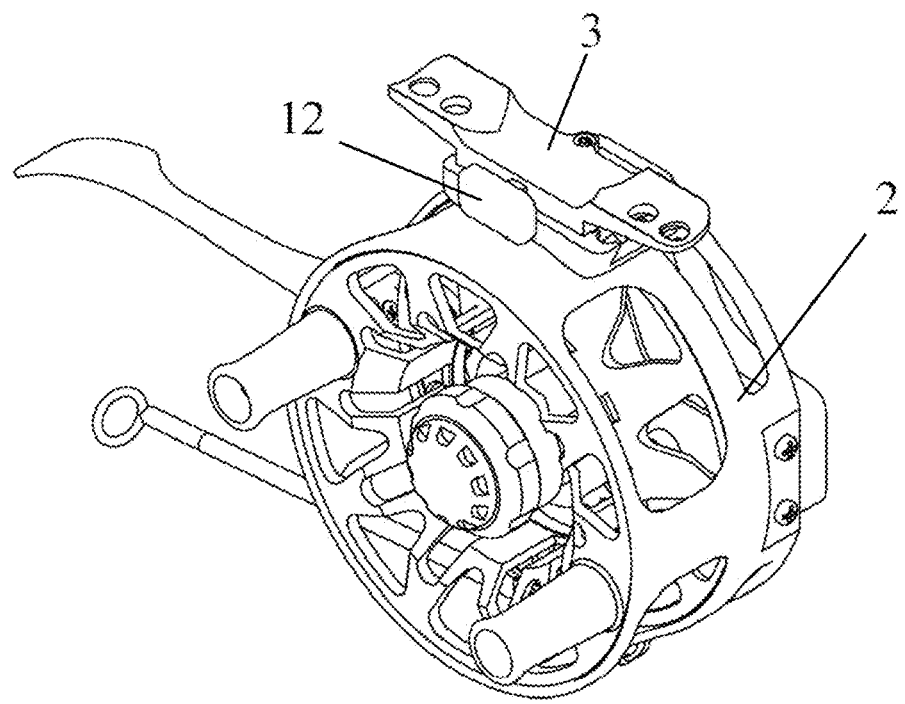
FIG. 6 shows a perspective view of a fishing reel in accordance with some embodiments.
Figure 7:
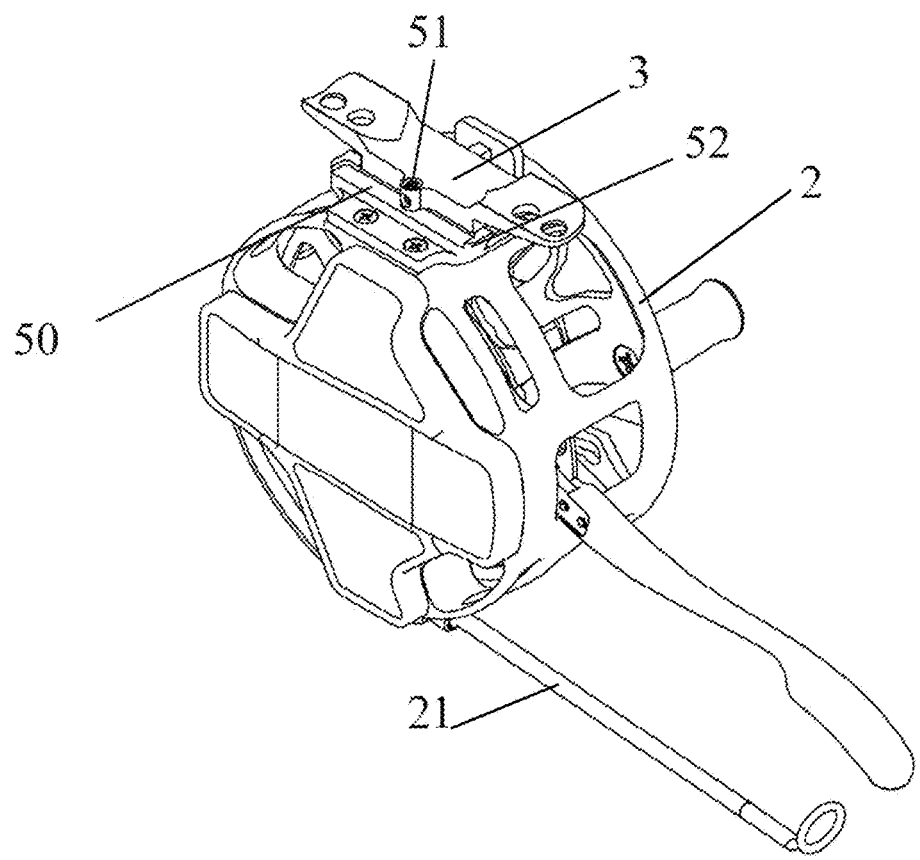
FIG. 7 shows an opposite perspective view of a fishing reel in accordance with some embodiments.

Anglers can use such adjustability to their desired preference in balancing a rod with their reel perhaps at a point within a middle of where they grip the rod. Such movement may provide counteracting of a weight of a rod and line going through rod line guides. An adjustment engagement (12) may be provided which may allow movement of the adjustable mounting foot perhaps providing unlocking of the adjustable mounting foot with the adjustment engagement (12) before said toolessly adjusting the placement of a fishing rod with respect to a fishing reel as may be understood in FIGS. 2, 4, and 6.

Figure 8:
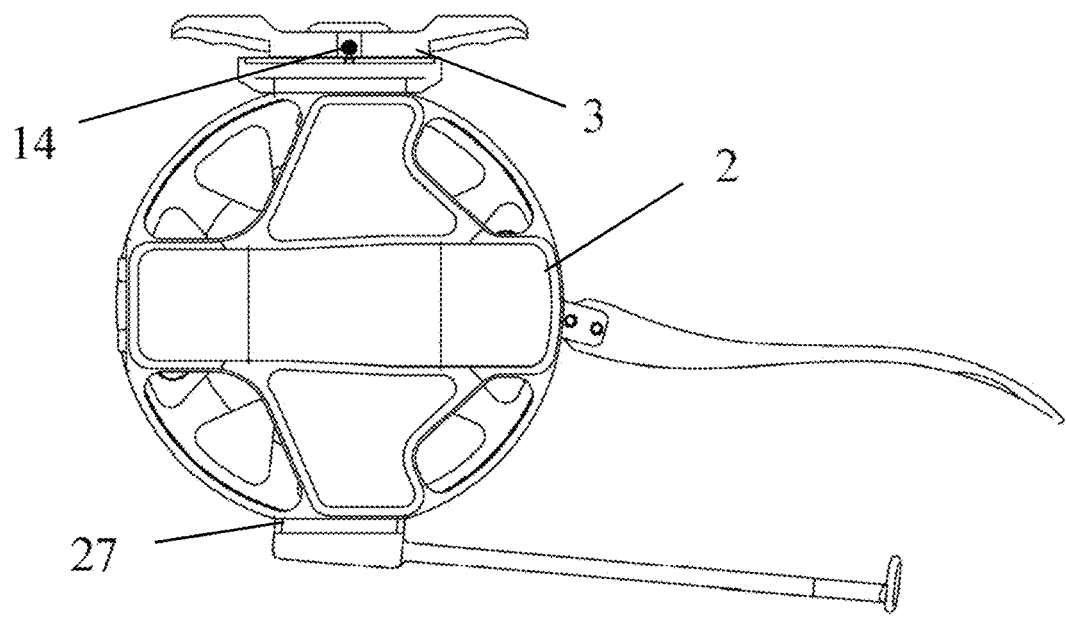
FIG. 8 shows a fishing reel and adjustable mounting foot in accordance with some embodiments.
Figure 9:
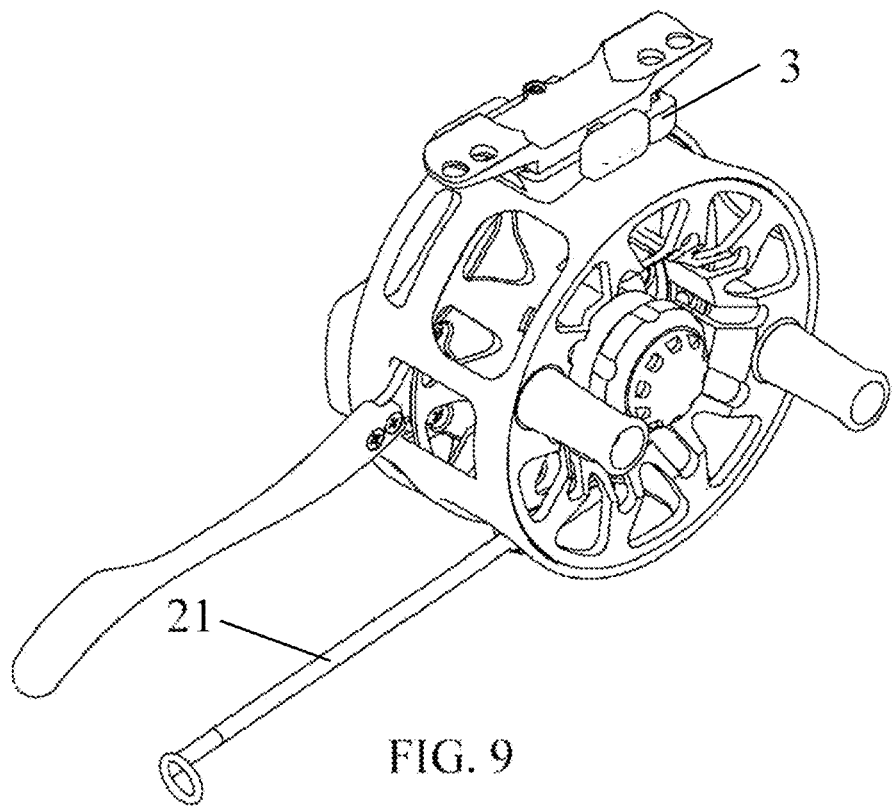
FIG. 9 shows a fishing reel and fishing line guide in accordance with some embodiments.

Adjustability of a mounting foot with an adjustment engagement (12) may include a button, lever, knob, fastener, a toolless adjustment or the like. An adjustment engagement (12) may unlock or even lock (14) movement or prevent movement of a mounting foot as may be understood in FIG. 8, which may allow movement of the mounting foot perhaps with a guide, sliding mechanism, a dovetail sliding mechanism, picatinny rail and screw posts, or the like. Movement of a position of the reel along a rod's length herein can aid in counterbalance, or even to allow a rod to settle evenly in the grip of an angler's hand.

Figure 3:
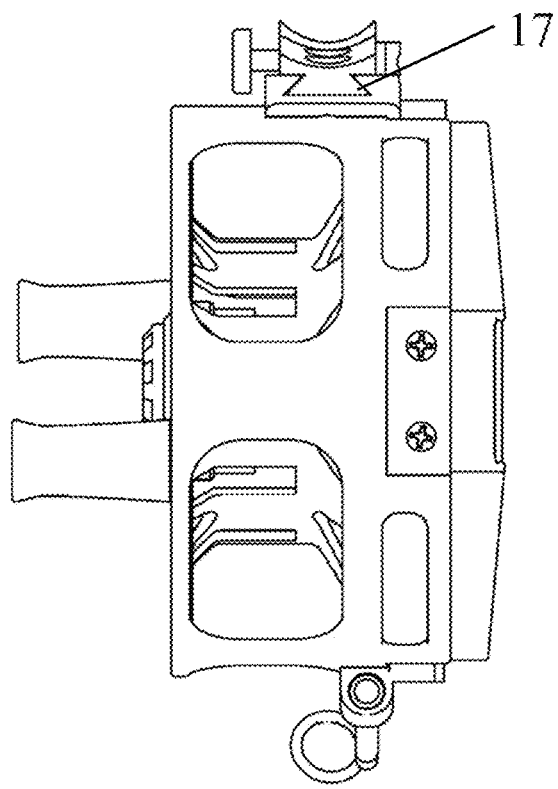
FIG. 3 shows an opposite side view of a fishing reel in accordance with some embodiments.

An adjustment mechanism (17) may be provided which may be any system or method to adjust or even move a mounting foot attached to a reel and may include but is not limited to, a guide, slide, a join, dovetail joint, an picatinny rail, a rail, screw posts, articulated motion, or the like such as show in FIG. 3. This may provide guiding a fishing rod along a guide of an adjustable mounting foot; sliding a fishing rod along a slide of an adjustable mounting foot; moving a fishing rod along a joint of an adjustable mounting foot; moving a fishing rod along a dovetail joint of an adjustable mounting foot; moving a fishing rod along a rail of an adjustable mounting foot; moving a fishing rod along a picatinny rail of an adjustable mounting foot; and perhaps even moving a fishing rod along screw posts of an adjustable mounting foot; or the like.

Figure 13:
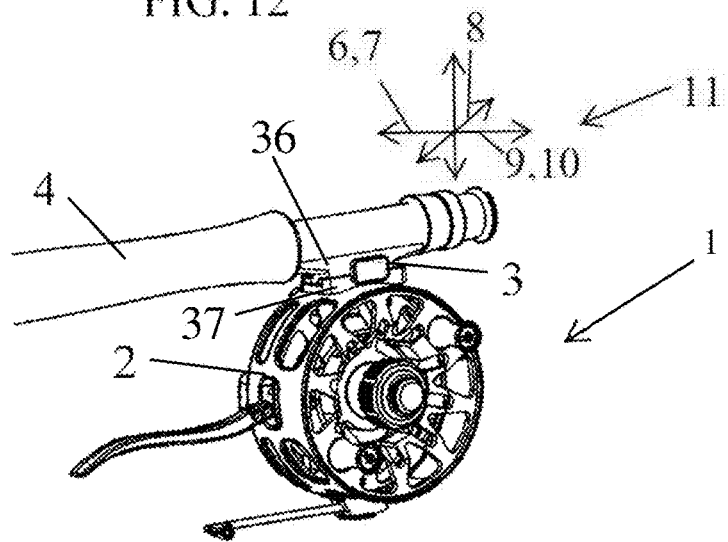
FIG. 13 shows a perspective view of a fishing reel attached to a fishing rod and adjustability thereof with an adjustable mounting foot in accordance with some embodiments.

In embodiments, an adjustable mounting foot may be taken apart perhaps creating two pieces such as a rod connector section (36) and a reel connector section (37). A rod connector section (36) may be a top part of an adjustable mounting foot and a reel connector section (37) may be a bottom part of the adjustable mounting foot. When all are connected, a fishing rod (4) may be attached to the rod connector section (36) which may be attached to a reel connector section (37) which may be attached to a reel (2) such as shown in FIG. 13. A reel connector section and a rod connector section may be attached to a reel and rod, respectively, with a removable attachment, a permanent attachment, screws, nails, or the like.

Figure 21:
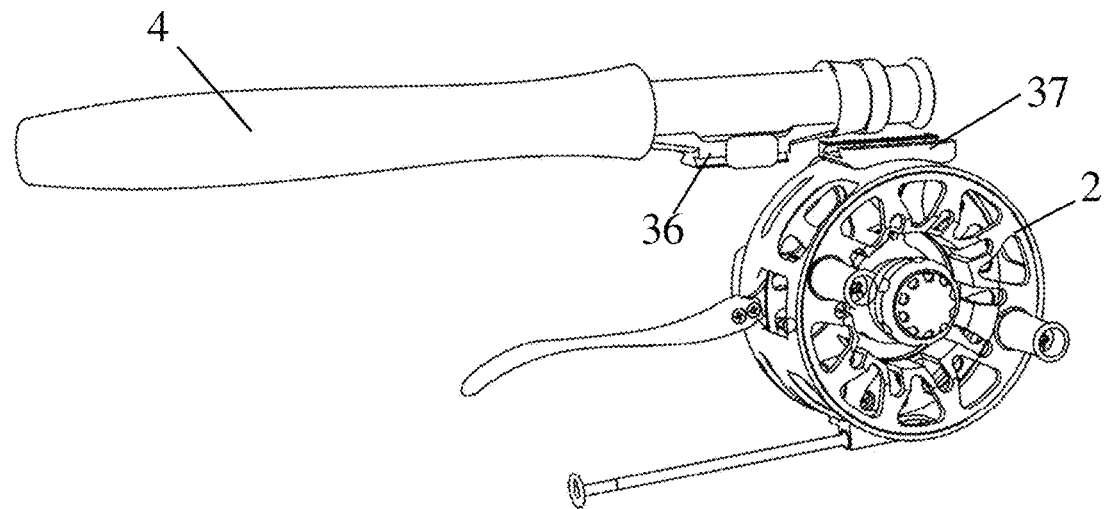
FIG. 21 shows a perspective view of a rod connector section and reel connector section of an adjustable mounting foot.
Figure 22:
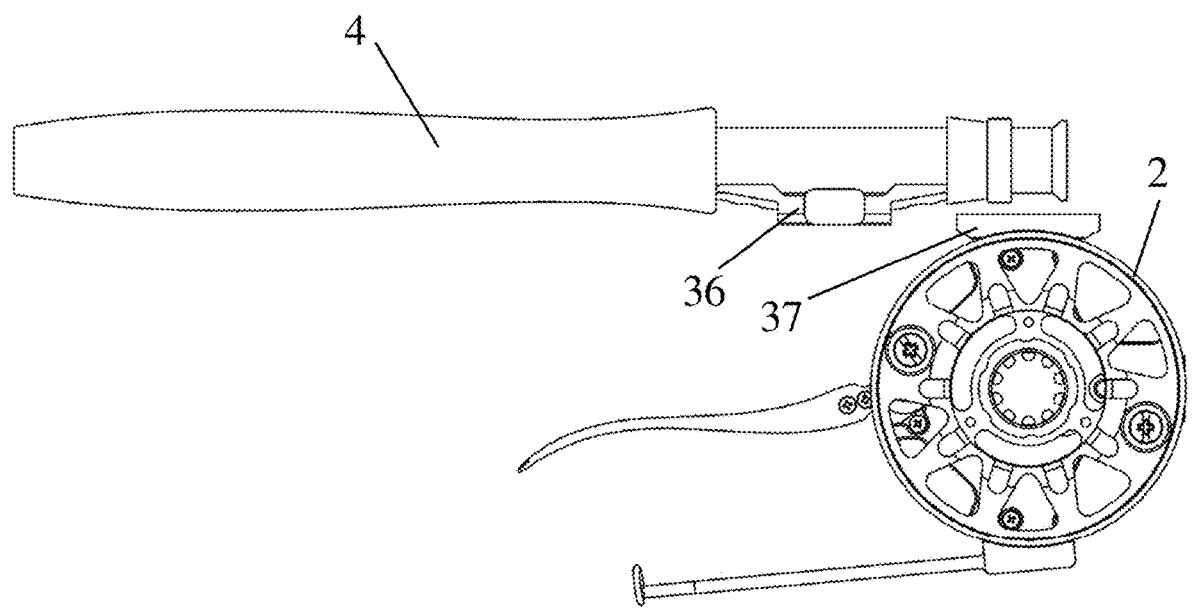
FIG. 22 shows a side view of a rod connector section and reel connector section of an adjustable mounting foot.

When connected, the adjustable mounting foot can be adjusted as described herein. In some embodiments, a mounting foot can be taken apart where a rod may be detached from a reel perhaps so that a user may easily switch the rod, reel, or the like. When a mounting foot may be disconnected, the rod connector section (36) may still be attached to a rod (4) and a reel connector section (37) may still be attached to a reel (2) as shown in FIGS. 21 and 22. A new reel such as a second reel having a compatible reel connector section with the rod connector section may be switched out with the old rod. A new rod such as a second rod having a compatible rod connector section with the reel connector section may be switched out with a new reel. A compatible rod connector section and a compatible reel connector section may be the same as, similar to, or even configured to attach to a Separability of a mounting foot may be achieved with an adjustment mechanism (17) as discussed herein. Switching out of a reel and/or rod may be accomplished without a tool perhaps providing toollessly replacing a reel or rod with another reel or rod.

Figure 14:
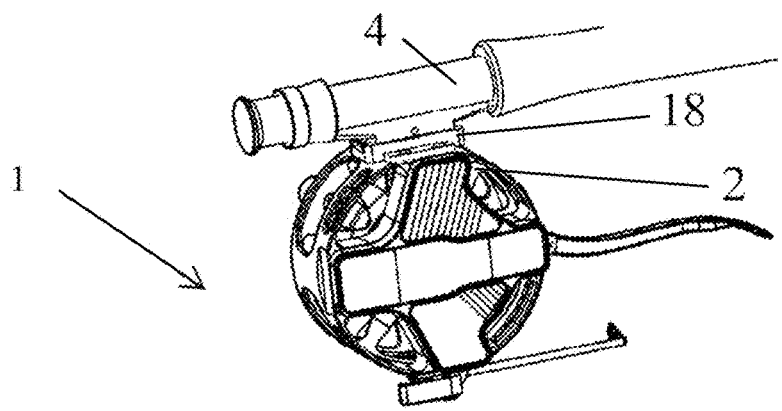
FIG. 14 shows a back view of a fishing reel attached to a fishing rod in accordance with some embodiments.

A toollessly adjustable mounting foot may be located parallel (18) to a fishing rod such as shown in FIG. 14. An adjustable mounting foot may be permanently attached or even removably attached to a fishing reel.

Figure 18:
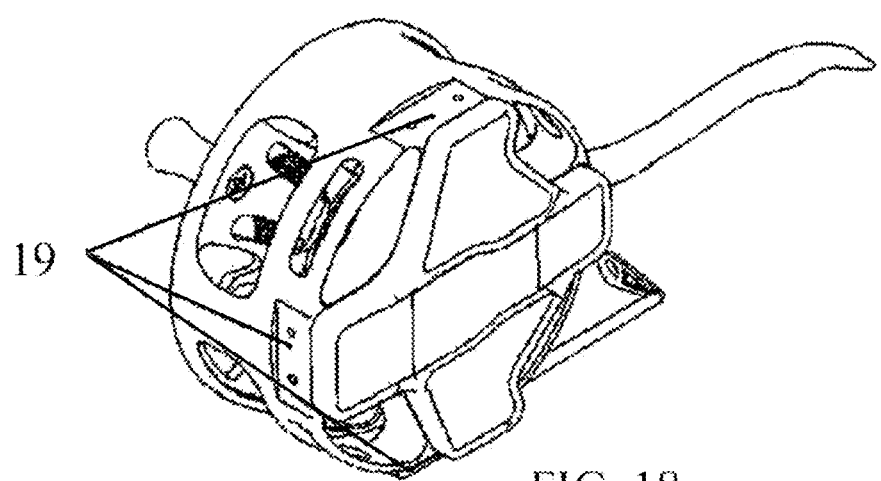
FIG. 18 shows mounts on a fishing reel assembly in accordance with some embodiments.

In embodiments, a reel, or even a reel housing may include at least one mount (19) as shown in FIG. 18. A mount may allow accessories (not shown) to be attached to a reel. A reel may have one, two, three, or more mounts. Accessories may include but is not limited to, a camera mount, clips, tackle, line guide, reel foot, thermometer, electronics. Bluetooth antennae. GPS, accelerometer, speaker, microphone, radio, battery, or the like. A mount may be permanently attached or even a removable attached to a reel. A mount and may be located around the perimeter, or even an outer perimeter, of a reel housing and may have several mounts for different accessory attachments. Such ability to attach accessories to a reel may allow users to attach any kind of accessory to their fishing rod and reel.

Fishing lines may keep a curled memory from being wound on a reel spool and as such may often get tangled around a rod and reel during use which can interrupt casting by the user. It can develop twists and loops which may catch on gear, including the reel itself, the butt of the rod near where it attaches to the reel, and the like. Past fly reels may have an opening in the reel frame to allow the line to be strung into the rod's guides, which may cause these loops, twists, and curls to rope themselves around the angler or itself.

Figure 10:
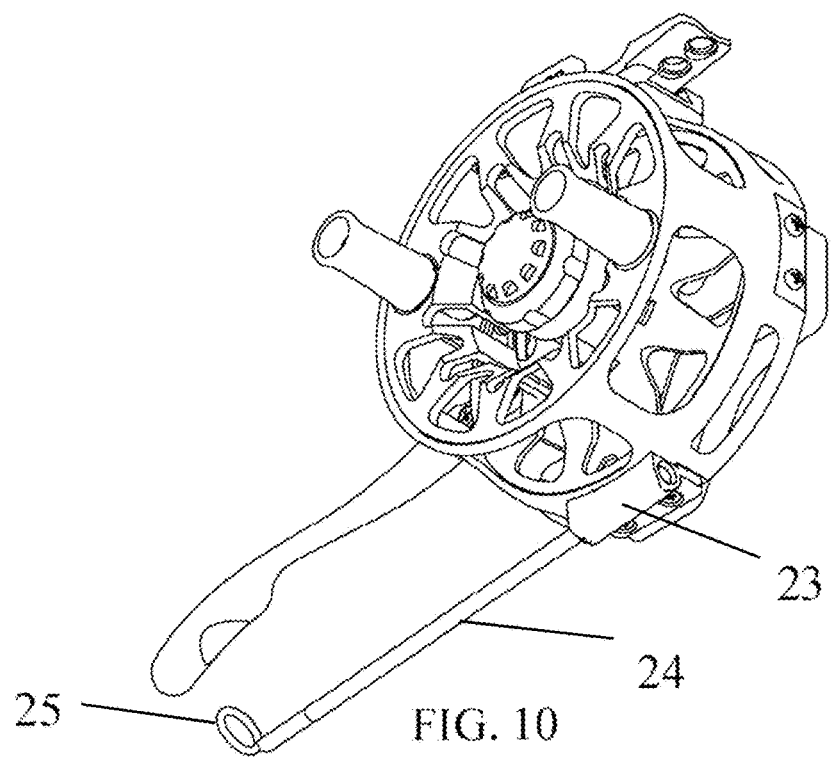
FIG. 10 shows a perspective view of adjustable fishing line guide in accordance with some embodiments.
Figure 11:
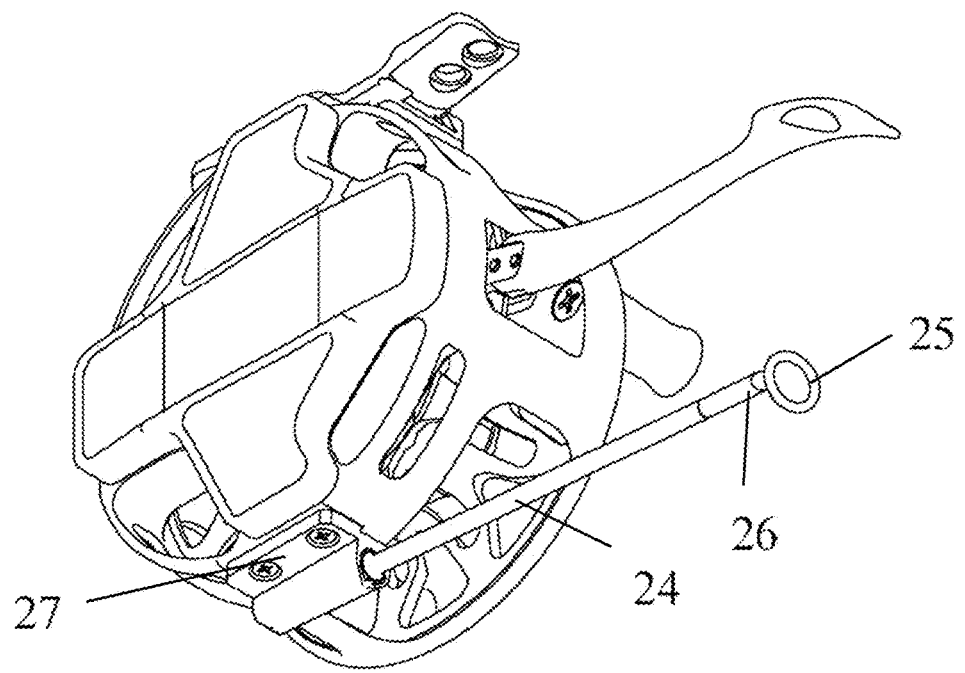
FIG. 11 shows another perspective view of adjustable fishing line guide in accordance with some embodiments.

Embodiments may provide a line guide (21) as shown in FIGS. 5, 7, 9, and 20 that can be attached to a fishing reel and that can direct a fishing line (30) away from the reel and even lever. A line guide can be removably attached to a fishing reel and a user ca thread a fishing line through a line guide. A line guide can help an angler to reduce and even eliminate tangling perhaps by extending a guide forward of a reel body and even closer to a stripping guide, which may be a first guide the line will enter on a rod. A line guide may be a toolless line guide such that it may be attached and even removed from a reel without using a tool. A line guide may be an adjustable length line guide (23) such as shown in FIGS. 10 and 19, where a line guide length can be adjusted and may enable user casting and retrieving of a line without tangles, and may even hold a fishing line away from a fishing reel. In some embodiments, a line guide may not be adjustable and may be at a fixed location. A line guide may include an extended arm (24) with a guide (25) at an end (26) of an extended arm such as shown in FIG. 11, perhaps configured to direct the line around the retrieval lever. Adjustability of a line guide may include adjusting its length perhaps by sliding the line guide through a mount, such as a removable mount, which may be attached to a bottom (27) of the reel frame. A line guide can be any shape and made from any material.

A line guide may prevent a fishing line from tangling over a reel lever or retrieve lever, may prevent fishing line from tangling over butt of rod. can be adjustable perhaps parallel with axis of rod or even biaxially. A line guide may be held or even locked in place perhaps with a cam lever, a clamping lever, friction, a mechanical locking feature, friction, lock, or the like.

A line guide may have a quick thread eyelet which can prevent an angler from having to re-thread the entire rod in the event that they forget to thread the line through the eyelet or perhaps decide to add or remove it during use. A lever on a semi-automatic reel can enable a smooth recovery of line from the ground to the spool, where the line can then be retrieved by turning the spool without introducing slack. A quick thread eyelet can provide to the angler, worry free addition, removal and even adjustment of the line guide without having to re-thread the line through the entire rod/eyelet setup. A quick thread eyelet may allow an angler to remove or even a adjust line guide without having to re-string the rod. In embodiments, a quick thread eyelet may be a helix that can be open on one end and can allow a line to be centered through a circular guide.

In embodiments, a fishing reel may have a sealed gear system that can eliminate corrosion and wear from outdoor elements such as dirt, mud, and water. A sealed gear system may include a water-tight housing that can encapsulate all moving gears. A lever may be attached outside of the housing but can engage the gears through the housing wall. A gasket or even a seal may be used to keep moisture and debris from entering the housing at this point. A rotary seal may be used to keep water from entering the housing from the spindle that centers on the reel spool. A lever-activated gear can engage the drive gears from a back of the gear housing, which can be opposite of other semi-automatic reel designs. A lever may be wider at a contact point where the angler can pull the lever up. A lever can be contoured to fit an angler's fingers more comfortably perhaps because the line will not entangle with the lever.

A sealed gear system may prevent environmental contamination and wear of drive-assembly; may prevent premature failure by protecting gears from sand and debris and/or liquid ingress; may be waterproof, and may be sealed with an element such as a sealing substrate, gaskets, seals, rubber, silicon, grease, and the like.

In embodiments, a semi-automatic fly reel can be used by first stringing a line, which is wound on the spool, through an extended line guide perhaps via the quick thread eyelet and through the guides on a fly rod. Next, a user could adjust the rod with respect to the reel by engaging an adjustable mounting foot perhaps with a button to slide the reel body forward, rearward, or even sideways, to balance the reel with the fly rod. Once this is done, the user can pull line off the spool which may be controlled by a disc drag system. This adjustment can be made on a textured knob which may encircle the post in the center of the spool. The spool can be held to reel frame by a threaded bolt backed by a textured knob turned by hand. The angler should turn the drag control knob left to loosen the spool, pull the desired amount of line out then turn the drag knob to the right to set the desired drag resistance. Once these preparatory steps have been taken, the user should eventually hook a fish and can pull line towards themselves at such a time. At this point the user can pull the lever up toward the rod grip. This action can engage a partial, curved gear which may be supported by two arms attached to the lever. The curved gear may turn against a main gear which can engage a series of gears which turn the spool quickly. This action can retrieve the loose line back onto the spool. At this point the user can then grab one of two freely-rotating knobs on the spool and to pull the fish in. If the fish pulls away from the angler, the drag may set and hold the desired amount of tension to allow the fish to swim away without adding slack to the line or breaking the line.

While the discussion herein has been described in connection with some embodiments, it is not intended to limit the scope of the application to the particular form set forth, but on the contrary, it is intended to cover such alternatives, modifications, and equivalents as may be included within the spirit and scope of the application. Examples of alternative clauses may include:

1. A fishing reel assembly comprising:
   a fishing reel; and
   a toollessly adjustable mounting foot attached to said fishing reel;
   wherein said toollessly adjustable mounting foot is configured to be attached to a fishing rod.
2. The fishing reel assembly as described in clause 1 or any other clause wherein said fishing reel comprises a fly-fishing reel.
3. The fishing reel assembly as described in clause 1 or any other clause wherein said toollessly adjustable mounting foot is configured to adjust in a direction chosen from forward, backward, sideways, upward, and downward.
4. The fishing reel assembly as described in clause 1 or any other clause wherein said toollessly adjustable mounting foot is configured to be adjusted without any separate tools
5. The fishing reel assembly as described in clause 1 or any other clause and further comprising an adjustment engagement configured to allow movement of said toollessly adjustable mounting foot.

6. The fishing reel assembly as described in clause 1 or any other clause and further comprising an adjustment lock configured to prevent movement of said toollessly adjustable mounting foot.
7. The fishing reel assembly as described in clause 5 or any other clause wherein said adjustment engagement is chosen from a button, lever, knob, and fastener.
8. The fishing reel assembly as described in clause 1 or any other clause wherein said toollessly adjustable mounting foot is located at a top of a fishing reel.
9. The fishing reel assembly as described in clause 1 or any other clause wherein said toollessly adjustable mounting foot is configured to allow a user to balance said fishing rod with respect to said fishing reel when being used.
10. The fishing reel assembly as described in clause 1 or any other clause wherein said toollessly adjustable mounting foot comprises an adjustment mechanism chosen from guide, slide, a joint, a dovetail joint, a picatinny rail, rail, and screw posts.
11. The fishing reel assembly as described in clause 1 or any other clause wherein said toollessly adjustable mounting foot is located parallel to said fishing rod.
12. The fishing reel assembly as described in clause 1 or any other clause wherein said toollessly adjustable mounting foot is permanently attached to said fishing reel.
13. The fishing reel assembly as described in clause 1 or any other clause wherein said toollessly adjustable mounting foot is removably attached to said fishing reel.
14. The fishing reel assembly as described in clause 1 or any other clause and further comprising at least one mount attached to said fishing reel; wherein said mount is configured to attach an accessory to said fishing reel.
15. The fishing reel assembly as described in clause 14 or any other clause wherein said accessory is chosen from a camera mount, a clip, a tackle, a line guide, a reel foot, thermometer, electronics, Bluetooth antennae, GPS, accelerometer, speaker, microphone, radio, and a battery.
16. The fishing reel assembly as described in clause 14 or any other clause wherein said at least one mount is permanently attached to said fishing reel or is removably attached to said fishing reel.
17. The fishing reel assembly as described in clause 1 or any other clause and further comprising a line guide configured to removably attach to said fishing reel.
18. The fishing reel assembly as described in clause 17 or any other clause wherein said line guide comprises a toolless line guide configured to be attached to said fishing reel and removed from said fishing reel without using a tool.
19. The fishing reel assembly as described in clause 17 or any other clause wherein said line guide comprises an adjustable length line guide.
20. The fishing reel assembly as described in clause 17 or any other clause wherein said line guide comprises an extended arm and a guide at an end of said extended arm; wherein said line guide is configured to hold a fishing line away from said fishing reel.
21. The fishing reel assembly as described in clause 17 or any other clause wherein said line guide is located at a bottom of said fishing reel.
22. The fishing reel assembly as described in clause 1 or any other clause wherein said toollessly adjustable mounting foot comprises a rod connector section and a reel connector section configured to be separated from each other.
23. The fishing reel assembly as described in clause 22 or any other clause wherein said rod connector section of said toollessly adjustable mounting foot is attached to said fishing rod; and wherein said reel connector section of said toollessly adjustable mounting foot is attached to said fishing reel.
24. The fishing reel assembly as described in clause 23 or any other clause and further comprising a compatible reel connector section attached to a second fishing reel configured to attach to said rod connector section attached to said fishing rod.
25. The fishing reel assembly as described in clause 23 or any other clause and further comprising a compatible rod connector section attached to a second fishing rod configured to attach to said reel connector section attached to said fishing rod.
26. A method of using a fishing reel assembly comprising:
providing a fishing reel having an adjustable mounting foot attached to said fishing reel;
attaching a fishing rod to said adjustable mounting foot; and
while said fishing rod is attached to said fishing reel with said adjustable mounting foot, toollessly adjusting said placement of said fishing rod with respect to said fishing reel with said adjustable mounting foot.
27. The method as described in clause 26 or any other clause wherein said fishing reel comprises a fly-fishing reel.
28 The method as described in clause 26 or any other clause wherein said step of toollessly adjusting said placement of said fishing rod with respect to said fishing reel with said adjustable mounting foot comprises toollessly adjusting said placement of said fishing rod in a direction chosen from forward, backward, sideways, upward, and downward.
29. The method as described in clause 26 or any other clause wherein said step of toollessly adjusting said placement of said fishing rod with respect to said fishing reel with said adjustable mounting foot comprises toollessly adjusting said placement of said fishing rod with respect to said fishing reel without any separate tools.
30. The method as described in clause 26 or any other clause and further comprising a step of unlocking said adjustable mounting foot with an adjustment engagement before said step of toollessly adjusting said placement of said fishing rod with respect to said fishing reel with said adjustable mounting foot.
31. The method as described in clause 26 or any other clause and further comprising a step of locking said adjustable mounting foot and preventing movement of said fishing rod with respect to said fishing reel.
32. The method as described in clause 30 or any other clause wherein said adjustment engagement is chosen from a button, lever, knob, and fastener.
33. The method as described in clause 26 or any other clause and further comprising a step of locating said adjustable mounting foot is at a top of said fishing reel.
34. The method as described in clause 26 or any other clause and further comprising a step of balancing said fishing rod with respect to said fishing reel when toollessly adjusting said placement of said fishing rod with respect to said fishing reel with said adjustable mounting foot.

35. The method as described in clause 26 or any other clause wherein said step of toolessly adjusting said placement of said fishing rod with respect to said fishing reel with said adjustable mounting foot comprises a step chosen from:
    guiding said fishing rod along a guide of said adjustable mounting foot;
    sliding said fishing rod along a slide of said adjustable mounting foot;
    moving said fishing rod along a joint of said adjustable mounting foot;
    moving said fishing rod along a dovetail joint of said adjustable mounting foot;
    moving said fishing rod along a rail of said adjustable mounting foot;
    moving said fishing rod along a picatinny rail of said adjustable mounting foot; and
    moving said fishing rod along screw posts of said adjustable mounting foot.
36. The method as described in clause 26 or any other clause and further comprising locating said fishing rod parallel to said adjustable mounting foot.
37. The method as described in clause 26 or any other clause wherein said step of providing said fishing reel having an adjustable mounting foot attached to said fishing reel comprises a step of providing said fishing reel having an adjustable mounting foot permanently attached to said fishing reel.
38. The method as described in clause 26 or any other clause wherein said step of providing said fishing reel having an adjustable mounting foot attached to said fishing reel comprises a step of providing said fishing reel having an adjustable mounting foot removably attached to said fishing reel.
39. The method as described in clause 26 or any other clause and further comprising a step of attaching an accessory to said fishing reel with a mount attached to said fishing reel.
40. The method as described in clause 39 or any other clause wherein said accessory is chosen from a camera mount, a clip, a tackle, a line guide, a reel foot, thermometer, electronics, Bluetooth antennae, GPS, accelerometer, speaker, microphone, radio, and a battery.
41. The method as described in clause 39 or any other clause wherein said mount is permanently attached to said fishing reel or is removably attached to said fishing reel.
42. The method as described in clause 26 or any other clause and further comprising a step of threading a fishing line through a line guide removably attached to said fishing reel.
43. The method as described in clause 42 or any other clause and further comprising toolessly attaching said line guide to said fishing reel and toolessly removing said line guide to said fishing reel.
44. The method as described in clause 42 or any other clause and further comprising a step of adjusting a length of said line guide.
45. The method as described in clause 42 or any other clause wherein said line guide comprises an extended arm and a guide at an end of said extended arm; and further comprising a step of holding said fishing line away from said fishing reel.
46. The method as described in clause 42 or any other clause and further comprising attaching said line guide to a bottom of said fishing reel.
47. The method as described in clause 26 or any other clause and further comprising toolessly removing said fishing reel attached to said adjustable mounting foot and said fishing rod; and toolessly attaching a second fishing reel to said adjustable mounting foot attached to said fishing rod.
48. The method as described in clause 26 or any other clause wherein said adjustable mounting foot comprises a rod connector section and a reel connector section; and further comprising separating said rod connector section from said reel connector section of said adjustable mounting foot to provide said rod connector section attached to said fishing rod and said reel connector section attached to said fishing reel.
49. The method as described in clause 48 or any other clause and further comprising attaching a compatible reel connector section attached to a second fishing reel to said rod connector section attached to said fishing rod.
50. The method as described in clause 48 or any other clause and further comprising attaching a compatible rod connector section attached to a second fishing rod to said reel connector section attached to said fishing reel.

As can be easily understood from the foregoing, the basic concepts of the various embodiments of the present invention(s) may be embodied in a variety of ways. It involves both fishing reel adjustability techniques as well as devices to accomplish the appropriate adjustable apparatus. In this application, the fishing reel adjustability techniques are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this application is intended to serve as a basic description. The reader should be aware that the specific discussion may not explicitly describe all embodiments possible; many alternatives are implicit. It also may not fully explain the generic nature of the various embodiments of the invention(s) and may not explicitly show how each feature or element can actually be representative of a broader function or of a great variety of alternative or equivalent elements. As one example, terms of degree, terms of approximation, and/or relative terms may be used. These may include terms such as the words: substantially, about, only, and the like. These words and types of words are to be understood in a dictionary sense as terms that encompass an ample or considerable amount, quantity, size, etc. as well as terms that encompass largely but not wholly that which is specified. Further, for this application if or when used, terms of degree, terms of approximation, and/or relative terms should be understood as also encompassing more precise and even quantitative values that include various levels of precision and the possibility of claims that address a number of quantitative options and alternatives. For example, to the extent ultimately used, the existence or non-existence of a substance or condition in a particular input, output, or at a particular stage can be specified as substantially only x or substantially free of x, as a value of about x, or such other similar language. Using percentage values as one example, these types of terms should be understood as encompassing the options of percentage values that include 99.5%. 99%, 97%, 95%, 92% or even 90% of the specified value or relative condition; correspondingly for values at the other end of the spectrum (e.g., substantially free of x, these should be understood as encompassing the options of percentage values that include not more than 0.5%, 1%, 3%, 5%, 8% or even 10% of the specified value or relative condition, all whether by volume or by weight as either may be specified). In context, these should be understood by a person of ordinary skill as being disclosed and included whether in an absolute value sense or in valuing one set of or substance as compared to the value of a second set of or substance. Again, these are implicitly included in this disclosure and should (and, it is believed, would) be understood to a person of ordinary skill in this field. Where the application is described in device-oriented terminology, each element of the device implicitly performs a function. Apparatus claims may not only be included for the device described, but also method or process claims may be included to address the functions of the embodiments and that each element performs. Neither the description nor the terminology is intended to limit the scope of the claims that will be included in any subsequent patent application.

It should also be understood that a variety of changes may be made without departing from the essence of the various embodiments of the invention(s). Such changes are also implicitly included in the description. They still fall within the scope of the various embodiments of the invention(s). A broad disclosure encompassing the explicit embodiment(s) shown, the great variety of implicit alternative embodiments, and the broad methods or processes and the like are encompassed by this disclosure and may be relied upon when drafting the claims for any subsequent patent application. It should be understood that such language changes and broader or more detailed claiming may be accomplished at a later date (such as by any required deadline) or in the event the applicant subsequently seeks a patent filing based on this filing. With this understanding, the reader should be aware that this disclosure is to be understood to support any subsequently filed patent application that may seek examination of as broad a base of claims as deemed within the applicant's right and may be designed to yield a patent covering numerous aspects of embodiments of the invention(s) both independently and as an overall system.

Further, each of the various elements of the embodiments of the invention(s) and claims may also be achieved in a variety of manners. Additionally, when used or implied, an element is to be understood as encompassing individual as well as plural structures that may or may not be physically connected. This disclosure should be understood to encompass each such variation, be it a variation of an embodiment of any apparatus embodiment, a method or process embodiment, or even merely a variation of any element of these. Particularly, it should be understood that as the disclosure relates to elements of the various embodiments of the invention(s), the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which embodiments of the invention(s) is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "mount" should be understood to encompass disclosure of the act of "mounting"—whether explicitly discussed or not—and, conversely, were there effectively disclosure of the act of "mounting", such a disclosure should be understood to encompass disclosure of a "mount" and even a "means for mounting." Such changes and alternative terms are to be understood to be explicitly included in the description. Further, each such means (whether explicitly so described or not) should be understood as encompassing all elements that can perform the given function, and all descriptions of elements that perform a described function should be understood as a non-limiting example of means for performing that function. As other non-limiting examples, it should be understood that claim elements can also be expressed as any of: components, programming, subroutines, logic, or elements that are configured to, or configured and arranged to, provide or even achieve a particular result, use, purpose, situation, function, or operation, or as components that are capable of achieving a particular activity, result, use, purpose, situation, function, or operation. All should be understood as within the scope of this disclosure and written description.

Any patents, publications, or other references mentioned in this application for patent are hereby incorporated by reference. Any priority case(s) claimed by this application is hereby appended and hereby incorporated by reference. In addition, as to each term used it should be understood that unless its utilization in this application is inconsistent with a broadly supporting interpretation, common dictionary definitions should be understood as incorporated for each term and all definitions, alternative terms, and synonyms such as contained in the Random House Webster's Unabridged Dictionary, second edition are hereby incorporated by reference. Finally, all references listed below or other information statement filed with the application are hereby appended and hereby incorporated by reference, however, as to each of the above, to the extent that such information or statements incorporated by reference might be considered inconsistent with the patenting of the various embodiments of invention(s) such statements are expressly not to be considered as made by the applicant(s).

REFERENCES TO BE INCORPORATED BY REFERENCE

U.S. PATENTS

| Patent Number | Kind Code | Issue Date | Name of Patentee or Applicant of cited Document |
|---|---|---|---|
| U.S. Pat. No. 5,481,820 | | Jan. 9, 1996 | Ohmura |
| U.S. Pat. No. 905,428 | | Dec. 1, 1908 | Heddon |
| U.S. Pat. No. 2,543,881 | | Mar. 6, 1951 | Umphlette |
| U.S. Pat. No. 5,291,683 | | Mar. 8, 1994 | Yamato |
| U.S. Pat. No. 5,904,000 | | May 18, 1999 | Ohmura |
| U.S. Pat. No. 6,105,301 | | Aug. 22, 2000 | Ohmura |
| U.S. Pat. No. 9,807,988 | B2 | Nov. 7, 2017 | Westerfield |
| U.S. Pat. No. 2,571,440 | | Oct. 16, 1951 | Goldberg |
| U.S. Pat. No. 5,467,932 | | Nov. 21, 1995 | Puryear |
| U.S. Pat. No. 5,669,566 | | Sep. 23, 1997 | Puryear |
| U.S. Pat. No. 7,178,751 | B1 | Feb. 20, 2007 | Isaacs |
| U.S. Pat. No. 6,283,393 | B1 | Sep. 4, 2001 | Kang |
| U.S. Pat. No. 6,874,719 | B2 | Apr. 5, 2005 | Ikuta |
| U.S. Pat. No. 9,554,565 | B2 | Jan. 31, 2017 | Koelewyn |
| U.S. Pat. No. 3,653,141 | | Apr. 4, 1972 | Rumbaugh |
| U.S. Pat. No. 8,833,689 | B1 | Sep. 16, 2014 | Brown |

U.S. PATENT APPLICATION PUBLICATIONS

| Publication Number | Kind Code | Publication Date | Name of Patentee or Applicant of cited Document |
|---|---|---|---|
| 2005/0034351 | A1 | Feb. 17, 2005 | Borgeat |
| 2013/0283665 | A1 | Oct. 31, 2013 | Poe |
| 2014/0151484 | A1 | Jun. 5, 2014 | Header |
| 2022/0394968 | A1 | Dec. 15, 2022 | Milton |
| 2013/0206889 | A1 | Aug. 15, 2013 | Ochiai |
| 2010/0001113 | A1 | Jan. 7, 2010 | Grahl |

NON-PATENT LITERATURE DOCUMENTS

Amazon.com: Orvis Clearwater Fly Rod Outfit (3wt 10'0" 4pc): Sports & Outdoors. Website. Obtained Jun. 30, 2023. 7 pages. https://www.amazon.com/Orvis-Clearwater-Fly-Rod-Outfit/dp/B09RS591ZM/ref=dp_prsubs_sccl_1/143-7961804-2693937?pd_rd_w=TsiCL&content-id . . .
Peux Fulgor Semi Automatic Fly Reel-Tactical Fly Fisher. Website. Obtained Jun. 30, 2023. 21 pages. https://tacticalflyfisher.com/products/peux-fulgor-semi-automatic-fly-reel
Amazon.com: Pflueger Automatic Fly Reel, Size 44385 Fishing Reel, Right Handle Position, Corrosion-Resistant Aluminum Alloy . . . Website. Obtained Jun. 30, 2023. 8 pages. https://www.amazon.com/gp/product/B000ZKPH3U/ref=as_li_qf_asin_il_tl?ie=UTF8&tag=wade21-20&creative=9325&linkCode=as2&creativeASIN=B . . .
G. Loomis NRX+ Freshwater Fly Rod | Trident Fly Fishing. Website. Obtained Jun. 30, 2023. 8 pages. https://www.tridentflyfishing.com/g-loomis-nrx-freshwater-fly-rod.html?avad=276093_a3196b5dd Thus, the applicant(s) should be understood to have support to claim and make claims to embodiments including at least: i) each of the fishing reel assembly devices as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such processes, methods, systems or components, ix) each system, method, and element shown or described as now applied to any specific field or devices mentioned, x) methods and apparatuses substantially as described hereinbefore and with reference to any of the accompanying examples, xi) an apparatus for performing the methods described herein comprising means for performing the steps, xii) the various combinations and permutations of each of the elements disclosed, xiii) each potentially dependent claim or concept as a dependency on each and every one of the independent claims or concepts presented, and xiv) all inventions described herein.

With regard to claims whether now or later presented for examination, it should be understood that for practical reasons and so as to avoid great expansion of the examination burden, the applicant may at any time present only initial claims or perhaps only initial claims with only initial dependencies. The office and any third persons interested in potential scope of this or subsequent applications should understand that broader claims may be presented at a later date in this case, in a case claiming the benefit of this case, or in any continuation in spite of any preliminary amendments, other amendments, claim language, or arguments presented, thus throughout the pendency of any case there is no intention to disclaim or surrender any potential subject matter. It should be understood that if or when broader claims are presented, such may require that any relevant prior art that may have been considered at any prior time may need to be re-visited since it is possible that to the extent any amendments, claim language, or arguments presented in this or any subsequent application are considered as made to avoid such prior art, such reasons may be eliminated by later presented claims or the like. Both the examiner and any person otherwise interested in existing or later potential coverage, or considering if there has at any time been any possibility of an indication of disclaimer or surrender of potential coverage, should be aware that no such surrender or disclaimer is ever intended or ever exists in this or any subsequent application. Limitations such as arose in *Hakim v. Cannon Avent Group, PLC.* 479 F.3d 1313 (Fed. Cir 2007), or the like are expressly not intended in this or any subsequent related matter. In addition, support should be understood to exist to the degree required under new matter laws—including but not limited to European Patent Convention Article 123 (2) and United States Patent Law 35 USC 132 or other such laws—to permit the addition of any of the various dependencies or other elements presented under one independent claim or concept as dependencies or elements under any other independent claim or concept. In drafting any claims at any time whether in this application or in any subsequent application, it should also be understood that the applicant has intended to capture as full and broad a scope of coverage as legally available. To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, if or when used, the use of the transitional phrases "comprising". "including", "containing", "characterized by" and "having" are used to maintain the "open-end" claims herein, according to traditional claim interpretation including that discussed in MPEP § 2111.03. Thus, unless the context requires otherwise, it should be understood that the terms "comprise" or variations such as "comprises" or "comprising". "include" or variations such as "includes" or "including", "contain" or variations such as "contains" and "containing". "characterized by" or variations such as "characterizing by", "have" or variations such as "has" or "having", are intended to imply the inclusion of a stated element or step or group of elements or steps but not the exclusion of any other element or step or group of elements or steps.

Such terms should be interpreted in their most expansive form so as to afford the applicant the broadest coverage legally permissible. The use of the phrase, "or any other claim" is used to provide support for any claim to be dependent on any other claim, such as another dependent claim, another independent claim, a previously listed claim, a subsequently listed claim, and the like. As one clarifying example, if a claim were dependent "on claim 9 or any other claim" or the like, it could be re-drafted as dependent on claim 1, claim 8, or even claim 11 (if such were to exist) if desired and still fall with the disclosure. It should be understood that this phrase also provides support for any combination of elements in the claims and even incorporates any desired proper antecedent basis for certain claim combinations such as with combinations of method, apparatus, process, and the like claims.

With respect to the drawings, it should be understood that these present only initial views, mirror views such as left, right, top, bottom, front, and back should be understood as within the realm of this disclosure as may be appropriate for design or industrial design protections. Furthermore, any aspect and any portion of such drawings should be understood as potentially not within the scope of any then-made claim such as by then dashing any portion desired. And such drawings should be understood as including drawing elements such as rectangles, circles, ellipses, ovals, squares, and the like as particular side or other views as well understood from the existing drawings.

Finally, any claims set forth at any time are hereby incorporated by reference as part of this description of the various embodiments of the application, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

What is claimed is:

1. A fishing reel assembly comprising:
   a fishing reel;
   a toollessly adjustable mounting foot configured to be attached to said fishing reel;
   wherein said toollessly adjustable mounting foot is configured to be attached to a fishing rod; and
      a push button adjustment engagement configured to unlock and allow movement of said toollessly adjustable mounting foot when pressed and configured to lock and prevent movement of said toollessly adjustable mounting foot when released.

2. The fishing reel assembly as described in claim 1 wherein said fishing reel comprises a fly-fishing reel.

3. The fishing reel assembly as described in claim 1 wherein said toollessly adjustable mounting foot is configured to adjust in a direction chosen from forward, backward, sideways, upward, and downward.

4. The fishing reel assembly as described in claim 1 wherein said toollessly adjustable mounting foot is configured to be adjusted without any separate tools.

5. The fishing reel assembly as described in claim 1 wherein said toollessly adjustable mounting foot is located at a top of a fishing reel.

6. The fishing reel assembly as described in claim 1 wherein said toollessly adjustable mounting foot is configured to allow a user to balance said fishing rod with respect to said fishing reel.

7. The fishing reel assembly as described in claim 1 wherein said toollessly adjustable mounting foot comprises an adjustment mechanism chosen from guide, slide, a joint, a dovetail joint, a picatinny rail, rail, and screw posts.

8. The fishing reel assembly as described in claim 1 wherein said toollessly adjustable mounting foot is located parallel to said fishing rod.

9. The fishing reel assembly as described in claim 1 wherein said toollessly adjustable mounting foot is permanently attached to said fishing reel.

10. The fishing reel assembly as described in claim 1 wherein said toollessly adjustable mounting foot is removably attached to said fishing reel.

11. The fishing reel assembly as described in claim 1 and further comprising at least one mount attached to said fishing reel; wherein said mount is configured to attach an accessory to said fishing reel.

12. The fishing reel assembly as described in claim 11 wherein said accessory is chosen from a camera mount, a clip, a tackle, a line guide, a reel foot, thermometer, electronics, Bluetooth antennae, GPS, accelerometer, speaker, microphone, radio, and a battery.

13. The fishing reel assembly as described in claim 11 wherein said at least one mount is permanently attached to said fishing reel or is removably attached to said fishing reel.

14. The fishing reel assembly as described in claim 1 and further comprising a line guide configured to removably attach to said fishing reel.

15. The fishing reel assembly as described in claim 14 wherein said line guide comprises a toolless line guide configured to be attached to said fishing reel and removed from said fishing reel without using a tool.

16. The fishing reel assembly as described in claim 14 wherein said line guide comprises an adjustable length line guide.

17. The fishing reel assembly as described in claim 14 wherein said line guide comprises an extended arm and a guide at an end of said extended arm; wherein said line guide is configured to hold a fishing line away from said fishing reel.

18. The fishing reel assembly as described in claim 14 wherein said line guide is located at a bottom of said fishing reel.

19. The fishing reel assembly as described in claim 1 wherein said toollessly adjustable mounting foot comprises a rod connector section and a reel connector section configured-to move with respect to each other.

20. The fishing reel assembly as described in claim 19 wherein said rod connector section of said toollessly adjustable mounting foot is attached to said fishing rod; and wherein said reel connector section of said toollessly adjustable mounting foot is attached to said fishing reel.

21. The fishing reel assembly as described in claim 20 and further comprising a compatible reel connector section attached to a second fishing reel configured to attach to said rod connector section attached to said fishing rod.

22. The fishing reel assembly as described in claim 20 and further comprising a compatible rod connector section attached to a second fishing rod configured to attach to said reel connector section attached to said fishing rod.

23. The fishing reel assembly as described in claim 19 and further comprising an adjustment mechanism configured to prevent detachment of said rod connector section from said reel connector section.

24. The fishing reel assembly as described in claim 23 wherein said adjustment mechanism comprises a projection on said rod connector section configured to slide along a guide of said reel connector section; wherein said guide comprises a stop; and wherein said projection on said rod connection section is configured to contact said stop and prevent said rod connection section from sliding off said reel connection section.

25. A method of using a fishing reel assembly comprising:
   providing a fishing reel having an adjustable mounting foot attached to said fishing reel;
   attaching a fishing rod to said adjustable mounting foot;
   while said fishing rod is attached to said fishing reel with said adjustable mounting foot, toollessly adjusting said placement of said fishing rod with respect to said fishing reel with said adjustable mounting foot;
   wherein said step of toollessly adjusting said placement of said fishing rod with respect to said fishing reel with said adjustable mounting foot comprises the steps of:
      unlocking said adjustable mounting foot by pressing a push button of said adjustable mounting foot;
      adjusting said adjustable mounting foot by moving part of said adjustable mounting foot away from another part of said adjustable mounting foot; and
      locking said adjustable mounting foot to prevent movement of said adjustable mounting foot by releasing said push button.

26. The method as described in claim 25 wherein said fishing reel comprises a fly-fishing reel.

27. The method as described in claim 25 wherein said step of toollessly adjusting said placement of said fishing rod with respect to said fishing reel with said adjustable mounting foot comprises toollessly adjusting said placement of said fishing rod in a direction chosen from forward, backward, sideways, upward, and downward.

28. The method as described in claim 25 wherein said step of toollessly adjusting said placement of said fishing rod with respect to said fishing reel with said adjustable mounting foot comprises toollessly adjusting said placement of said fishing rod with respect to said fishing reel without any separate tools.

29. The method as described in claim 25 and further comprising a step of locating said adjustable mounting foot at a top of said fishing reel.

30. The method as described in claim 25 and further comprising a step of balancing said fishing rod with respect to said fishing reel when toollessly adjusting said placement of said fishing rod with respect to said fishing reel with said adjustable mounting foot.

31. The method as described in claim 25 wherein said step of toollessly adjusting said placement of said fishing rod with respect to said fishing reel with said adjustable mounting foot comprises a step chosen from:
   guiding said fishing rod along a guide of said adjustable mounting foot;
   sliding said fishing rod along a slide of said adjustable mounting foot;
   moving said fishing rod along a joint of said adjustable mounting foot;
   moving said fishing rod along a dovetail joint of said adjustable mounting foot;
   moving said fishing rod along a rail of said adjustable mounting foot;
   moving said fishing rod along a picatinny rail of said adjustable mounting foot; and
   moving said fishing rod along screw posts of said adjustable mounting foot.

32. The method as described in claim 25 and further comprising a step of locating said fishing rod parallel to said adjustable mounting foot.

33. The method as described in claim 25 wherein said step of providing said fishing reel having an adjustable mounting foot attached to said fishing reel comprises a step of providing said fishing reel having an adjustable mounting foot permanently attached to said fishing reel.

34. The method as described in claim 25 wherein said step of providing said fishing reel having an adjustable mounting foot attached to said fishing reel comprises a step of providing said fishing reel having an adjustable mounting foot removably attached to said fishing reel.

35. The method as described in claim 25 and further comprising a step of attaching an accessory to said fishing reel with a mount attached to said fishing reel.

36. The method as described in claim 35 wherein said accessory is chosen from a camera mount, a clip, a tackle, a line guide, a reel foot, thermometer, electronics, Bluetooth antennae, GPS, accelerometer, speaker, microphone, radio, and a battery.

37. The method as described in claim 35 wherein said mount is permanently attached to said fishing reel or is removably attached to said fishing reel.

38. The method as described in claim 25 and further comprising a step of threading a fishing line through a line guide removably attached to said fishing reel.

39. The method as described in claim 38 and further comprising toollessly attaching said line guide to said fishing reel and toollessly removing said line guide to said fishing reel.

40. The method as described in claim 38 and further comprising a step of adjusting a length of said line guide.

41. The method as described in claim 38 wherein said line guide comprises an extended arm and a guide at an end of said extended arm; and further comprising a step of holding said fishing line away from said fishing reel.

42. The method as described in claim 38 and further comprising attaching said line guide to a bottom of said fishing reel.

43. The method as described in claim 25 and further comprising toollessly removing said fishing reel attached to said adjustable mounting foot and said fishing rod; and toollessly attaching a second fishing reel to said adjustable mounting foot attached to said fishing rod.

44. The method as described in claim 25 wherein said adjustable mounting foot comprises a rod connector section and a reel connector section; and further comprising separating said rod connector section from said reel connector section of said adjustable mounting foot to provide said rod connector section attached to said fishing rod and said reel connector section attached to said fishing reel.

45. The method as described in claim 44 and further comprising attaching a compatible reel connector section attached to a second fishing reel to said rod connector section attached to said fishing rod.

46. The method as described in claim 44 and further comprising attaching a compatible rod connector section attached to a second fishing rod to said reel connector section attached to said fishing reel.

47. The method as described in claim 25 wherein said step of adjusting said adjustable mounting foot by moving part of said adjustable mounting foot away from another part of said adjustable mounting foot adjustable mounting foot comprises the steps of:
   sliding a rod connector section of said adjustable mounting foot along a guide of a reel connector section of said adjustable mounting foot; and
   preventing said rod connector section from detaching from said reel connector section of said adjustable mounting foot.

48. The method as described in claim 47 wherein said step of preventing said rod connector section from detaching from said reel connector section of said adjustable mounting foot comprises a step of preventing movement of said rod connector section when a projection of said rod connector section meets a stop of said reel connector section.

\* \* \* \* \*